United States Patent
Steinmetz et al.

(10) Patent No.: US 6,358,184 B1
(45) Date of Patent: Mar. 19, 2002

(54) MODEL-BASED CONTROL OF AN AUTOMATIC TRANSMISSION GARAGE SHIFT

(75) Inventors: Todd M Steinmetz, Indianapolis; Gregory A Hubbard, Carmel; Charles Francis Long, Pittsboro; Sean E Gleason, Indianapolis; Jeffrey Kurt Runde, Fishers; Phillip F McCauley, Zionsville; Martin Robert Dadel, Indianapolis, all of IN (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/567,597

(22) Filed: May 10, 2000

Related U.S. Application Data

(63) Continuation-in-part of application No. 09/528,609, filed on Mar. 20, 2000.

(51) Int. Cl.⁷ .............................................. F16H 61/06
(52) U.S. Cl. ........................ 477/143; 477/154; 477/159; 701/60
(58) Field of Search ................................. 477/143, 154, 477/159; 701/60

(56) References Cited

U.S. PATENT DOCUMENTS

| | | |
|---|---|---|
| 4,070,927 A | 1/1978 | Polak |
| 5,029,086 A * | 7/1991 | Yoshimura .................... 701/60 |
| 5,046,178 A | 9/1991 | Hibner et al. |
| 5,123,302 A * | 6/1992 | Brown et al. ................ 477/154 |
| 5,601,506 A | 2/1997 | Long et al. .................. 475/120 |

\* cited by examiner

*Primary Examiner*—Sherry Estremsky
(74) *Attorney, Agent, or Firm*—Laura C. Hargitt; Leslie C. Hodges

(57) ABSTRACT

An improved control for an automatic transmission garage shift, wherein a dynamic model of the transmission is used to estimate the transmission input torque during the shift and to schedule the on-coming clutch pressure in accordance with the estimated input torque to achieve a desired input shaft trajectory. The transmission input torque is estimated based on two different methodologies —one suited to steady-state engine idle conditions, and the other suited to engine output torque transient conditions. A fuzzy summation of the input torques provided by the two methodologies is utilized in transitions between the two conditions. Shift quality variations due to variations in mechanical and/or hydraulic stiffness are minimized by a pause or hold interval inserted between the end of the fill period and the initiation of on-coming clutch pressure control, which results in a reasonably consistent degree of perceived transmission-to-transmission hydraulic and mechanical compliance.

7 Claims, 4 Drawing Sheets

MODEL-BASED CONTROL OF AN AUTOMATIC TRANSMISSION GARAGE SHIFT

RELATED APPLICATIONS

This is a continuation-in-part of co-pending U.S. patent application Ser. No. 09/528,609, filed on Mar. 20, 2000, and assigned to the assignee of the present invention.

TECHNICAL FIELD

This invention relates to a model-based shift control for an automatic transmission, and more particularly to a pressure control of the on-coming clutch during a garage shift.

BACKGROUND OF THE INVENTION

In general, a motor vehicle automatic transmission includes a number of gear elements and selectively engageable friction elements (referred to herein as clutches) that are controlled to establish one of several forward speed ratios between the transmission input and output shafts. The input shaft is coupled to the vehicle engine through a fluid coupling such as a torque converter, and the output shaft is coupled to the vehicle drive wheels through a differential gearset.

While most transmission shifts involve coordinated disengagement of an off-going clutch and engagement an on-coming clutch, the class of shifts commonly referred to as garage shifts (neutral-to-forward, neutral-to-reverse, forward-to-reverse, reverse-to-forward) ordinarily involve simply engaging an on-coming clutch, or disengaging an off-going clutch and then engaging an oncoming clutch. A representative control for garage shifting is set forth in the U.S. Pat. No. 5,046,178 to Hibner et al., issued on Sep. 3, 1991, and assigned to the assignee of the present invention. In Hibner et al., the oncoming clutch is filled in preparation for engagement, and when a transmission input speed disturbance indicative of on-coming clutch torque capacity is detected, a closed-loop control of the on-coming pressure forces the input speed to follow a desired speed profile until the synchronous speed of the target speed ratio is reached, whereupon the shift is completed by fully engaging the on-coming clutch.

While the above-described control is capable of achieving reasonably good garage shifting under controlled conditions, variations in the transmission input torque (due to changes in engine output torque and/or the torque ratio of the torque converter) can significantly degrade the shift quality. Additionally, variations in mechanical and/or hydraulic stiffness (compliance) from transmission-to-transmission tend to result in vehicle-to-vehicle shift quality variations. Accordingly, what is needed is a control that produces consistent high quality garage shifts in spite of these variations.

SUMMARY OF THE INVENTION

The present invention is directed to an improved control for an automatic transmission garage shift, wherein a dynamic model of the transmission is used to estimate the transmission input torque during the shift and to schedule the on-coming clutch pressure in accordance with the estimated input torque to achieve a desired input shaft trajectory. The transmission input torque is estimated based on two different methodologies—one suited to steady-state engine idle conditions, and the other suited to engine output torque transient conditions. A fuzzy summation of the input torques provided by the two methodologies is utilized in transitions between the two conditions. Shift quality variations due to variations in mechanical and/or hydraulic stiffness are minimized by a pause inserted between the end of the fill period and the initiation of on-coming clutch pressure control, which results in a reasonably consistent degree of perceived transmission-to-transmission hydraulic and mechanical compliance. As a result, the control of this invention provides consistent high quality garage shifting, with less intensive calibration effort and improved adaptability to different powertrain and vehicle-type configurations.

DESCRIPTION OF THE PREFERRED EMBODIMENT

The control of this invention is described in the context of a multi-ratio power transmission having a planetary gearset of the type described in the U.S. Pat. No. 4,070,927 to Polak, and having an electro-hydraulic control of the type described in U.S. Pat. No. 5,601,506 to Long et al. Accordingly, the gearset and control elements shown in FIG. 1 hereof have been greatly simplified, it being understood that further information regarding the fluid pressure routings and so on may be found in the aforementioned patents.

Figures 1, 2:
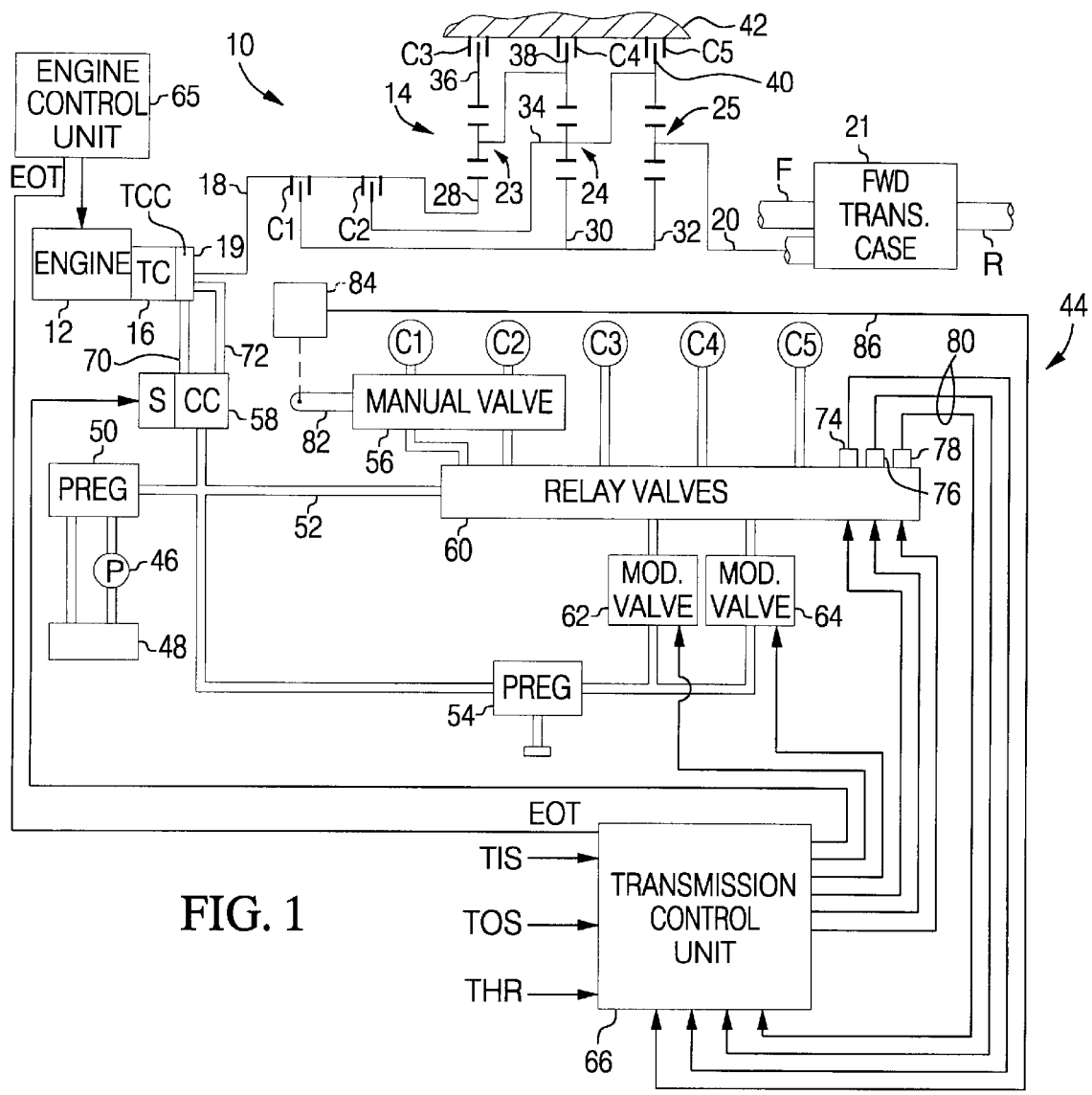
FIG. 1 is a diagram of an automatic transmission and microprocessor-based control unit for carrying out the control of this invention.
FIG. 2 is a table indicating a relationship between transmission clutch activation and corresponding speed ratio.

Referring to FIG. 1, the reference numeral 10 generally designates a vehicle powertrain including engine 12, transmission 14, and a torque converter 16 providing a fluid coupling between engine 12 and transmission input shaft 18. A torque converter clutch 19 is selectively engaged under certain conditions to provide a mechanical coupling between engine 12 and transmission input shaft 18. The transmission output shaft 20 is coupled to the driving wheels of the vehicle in one of several conventional ways. The illustrated embodiment depicts a four-wheel-drive (FWD) application in which the output shaft 20 is connected to a transfer case 21 that is also coupled to a rear drive shaft R and a front drive shaft F. Typically, the transfer case 21 is manually shiftable to selectively establish one of several drive conditions, including various combinations of two-wheel-drive and four-wheel drive, and high or low speed range, with a neutral condition occurring intermediate the two and four wheel drive conditions.

The transmission 14 has three inter-connected planetary gearsets, designated generally by the reference numerals 23, 24 and 25. The input shaft 18 continuously drives a sun gear 28 of gearset 23, selectively drives the sun gears 30, 32 of gearsets 24, 25 via clutch C1, and selectively drives the carrier 34 of gearset 24 via clutch C2. The ring gears 36, 38, 40 of gearsets 23, 24, 25 are selectively connected to ground 42 via clutches C3, C4 and C5, respectively.

As diagrammed in FIG. 2, the state of the clutches C1–C5 (i.e., engaged or disengaged) can be controlled to provide six forward speed ratios (1, 2, 3, 4, 5, 6), a Reverse speed ratio (R) or a Neutral condition (N). For example, the first forward speed ratio is achieved by engaging clutches C1 and C5. Garage shifting (Neutral-to-forward, Neutral-to-Reverse, Forward-to-Reverse, Reverse-to-Forward) ordinarily involves controlling the engagement of a single on-coming clutch, although other clutches may need to be engaged or disengaged prior to the controlled engagement. For example, the transmission 14 is shifted from Neutral to the First ratio by engaging the forward range clutch C1, and then controlling the engagement of clutch C5.

The torque converter clutch 19 and the transmission clutches C1–C5 are controlled by an electro-hydraulic control system, generally designated by the reference numeral 44. The hydraulic portions of the control system 44 include a pump 46 which draws hydraulic fluid from a reservoir 48, a pressure regulator 50 which returns a portion of the pump output to reservoir 48 to develop a regulated pressure in line 52, a secondary pressure regulator valve 54, a manual valve 56 manipulated by the driver of the vehicle and a number of solenoid operated fluid control valves 58–64.

The electronic portion of the control is primarily embodied in the engine control unit 65 and the transmission control unit 66, illustrated in FIG. 1 as two separate modules. Both control units 65, 66 are microprocessor-based, and may be conventional in architecture. The engine control unit 65 controls the operation of engine functions such as fuel, spark timing, and so on depending on the control variables afforded by engine 12, and the transmission control unit 66 controls the solenoid operated fluid control valves 58–64 based on a number of inputs to achieve a desired transmission speed ratio. The transmission control unit inputs include signals representing the transmission input speed TIS, an engine throttle setting THR, engine speed ES, and transmission output speed TOS. Sensors for developing such signals may be conventional in nature, and have been omitted for simplicity. Additionally, the engine control unit 65 supplies an engine output torque signal EOT to transmission control unit 66.

The control lever 82 of manual valve 56 is coupled to a sensor and display module 84 that produces a diagnostic signal on line 86 based on the control lever position; such signal is conventionally referred to as a PRNDL signal, since it indicates which of the transmission ranges (P, R, N, D or L) has been selected by the vehicle driver. Finally, the fluid control valves 60 are provided with pressure switches 74, 76, 78 for supplying diagnostic signals to control unit 66 on lines 80 based on the respective relay valve positions. The control unit 66, in turn, monitors the various diagnostic signals for the purpose of electrically verifying proper operation of the controlled elements.

The solenoid operated fluid control valves 58–64 are generally characterized as being either of the on/off or modulated type. To reduce cost, the electro-hydraulic control system 44 is configured to minimize the number of modulated fluid control valves, as modulated valves are generally more expensive to implement. To this end, a set of three on/off relay valves, shown in FIG. 1 as a consolidated block 60, are utilized in concert with manual valve 56 to enable controlled engagement and disengagement of each of the clutches C1–C5 with only two modulated valves 62, 64. For any selected ratio, the control unit 66 activates a particular combination of relay valves 60 for coupling one of the modulated valves 62, 64 to the on-coming clutch, and the other modulated valve 62, 64 to the off-going clutch.

The modulated valves 62, 64 each comprise a conventional pressure regulator valve biased by a variable pilot pressure that is developed by current controlled force motor. The fluid controlled valve 58 is also a modulated valve, and controls the fluid supply path to converter clutch 19 in lines 70, 72 for selectively engaging and disengaging the converter clutch 19. The transmission control unit 66 determines pressure commands for engaging and/or disengaging the respective clutches C1–C5, develops corresponding force motor current commands, and then supplies current to the respective force motors in accordance with the current commands.

The present invention is directed to an improved control strategy for garage shifts, and in particular, to a control strategy for the controlled oncoming clutch. A dynamic model of the transmission is used to estimate the transmission input torque TQin during the shift and to schedule the on-coming clutch pressure Ponc in accordance with the estimated input torque TQin to achieve a desired input shaft trajectory. The model is used to develop a feed-forward pressure control term Ponc__FF for achieving a desired acceleration trajectory TRAJaccel of the input shaft 18, given the estimate of transmission input torque TQin. In a preferred implementation, the feed-forward control term Ponc__FF is combined with a feed-back control term Ponc__FB based on a comparison of the expected input shaft speed with the measured input speed TIS during an inertia phase of the shift so as to correct for modeling errors in the feed-forward control. Additionally, the closed-loop feedback error ERR may be used to enable adaptive correction of the feed-forward control so that the scheduled on-coming clutch pressure more nearly produces the commanded input shaft trajectory.

The transmission input torque TQin is estimated based on two different methodologies—a first methodology based upon a steady state model of the torque converter 16, and a second methodology based upon the engine output torque signal EOT provided by the engine control unit 65. The first methodology is utilized during steady-state engine idle conditions, while the second methodology is utilized during engine output torque transient conditions. A fuzzy summation of the input torques provided by the two methodologies is utilized in transitions between the two conditions.

Finally, shift quality variations due to variations in mechanical and/or hydraulic stiffness are minimized by a pause or hold interval between the end of the fill period and the initiation of on-coming clutch pressure control, which results in a reasonably consistent degree of perceived transmission-to-transmission compliance. In particular, the on-coming clutch pressure initially scheduled upon completion of the fill period, less a predefined compliance value, is maintained for a predefined hold time, after which it is returned to the scheduled pressure as a calibrated ramp rate. As a result, the on-coming clutch pressure rises to the scheduled pressure at a rate that varies to only a small degree from one transmission to another. This ensures consistent high quality shift initiation despite the variability in mechanical and/or hydraulic stiffness.

Figure 3:
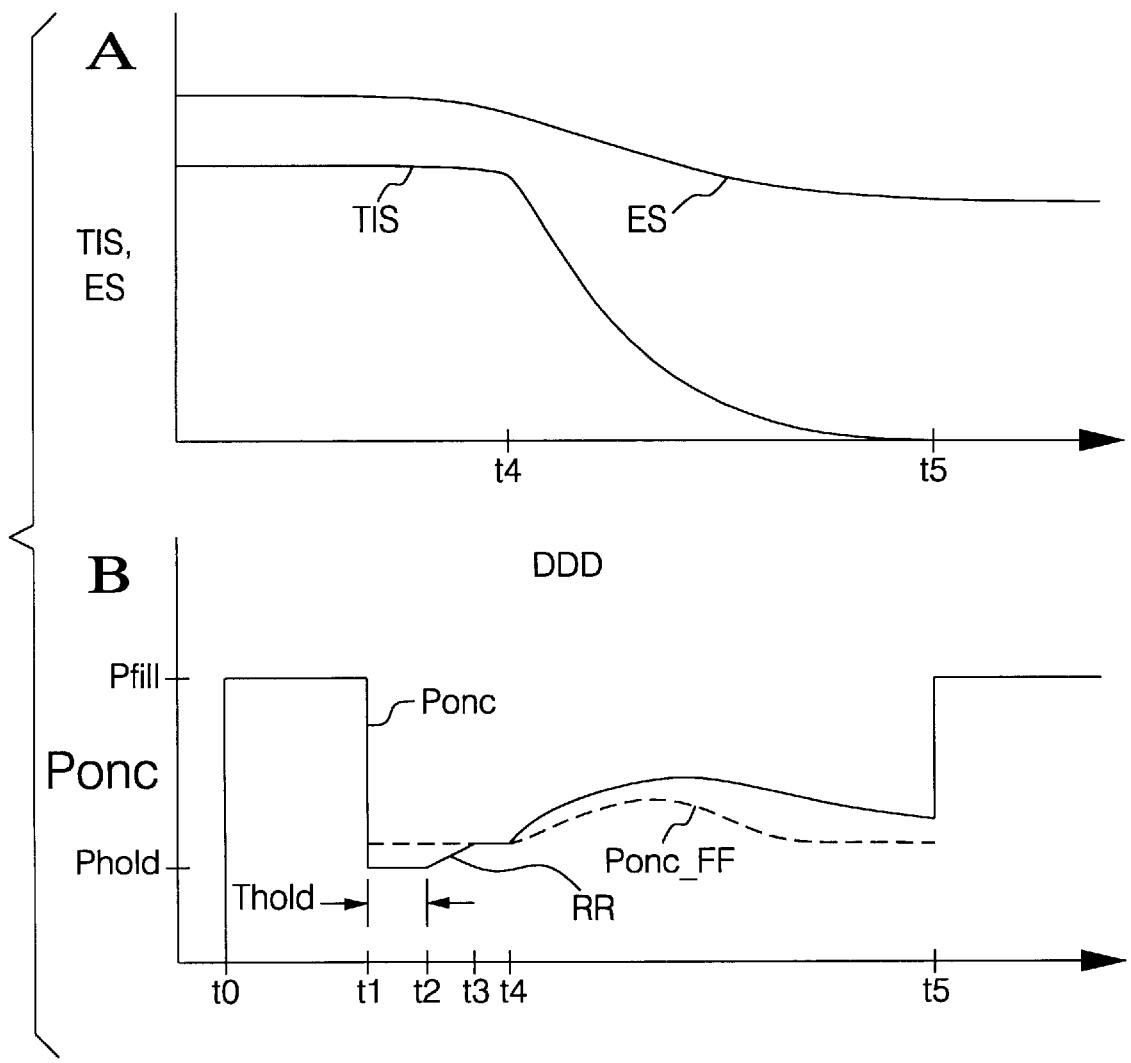
FIG. 3, Graphs A and B, graphically depict a garage shift according to this invention.

FIG. 3 graphically depicts a Neutral-to-First garage shift carried out according to this invention. Referring to FIG. 3, Graph A depicts both engine speed ES and transmission input speed TIS, and Graph B depicts the commanded on-coming clutch pressure Ponc (solid trace). As indicated, the broken trace in Graph B represents the model-based feed-forward component Ponc_FF of the on-coming pressure control. Initially, the transmission is in Neutral, and it is assumed for purposes of illustration that forward clutch C1 has already been engaged. Prior to engagement of the on-coming clutch (clutch C5, in this instance), there is a relatively small amount of slip across the torque converter 16, as indicated by the difference (ES−TIS). The shift is initiated at time t0 by increasing Ponc to a relatively high value designated in Graph B as Pfill. The pressure command Ponc is maintained at Pfill for a determined fill interval Tfill, after which the on-coming clutch is presumed to be filled and ready to transmit torque. Various control methods may be used to adaptively determine the fill interval Tfill; see, for example the U.S. Pat. No. 5,072,390 to Lentz et al., issued on Dec. 10, 1991, and incorporated herein by reference, and also the co-pending U.S. patent application Ser. No. 09/XXX,XXX (Attorney Docket No. GP-300162), filed on May 9, 2000, both of which are assigned to the assignee of the present invention. On completion of the fill interval Tfill, the control unit 66 estimates the transmission input torque TQin and computes a model-based feed-forward clutch pressure Ponc_FF that will satisfy the input acceleration trajectory TRAJaccel, given the estimate of TQin.

Figure 4A:
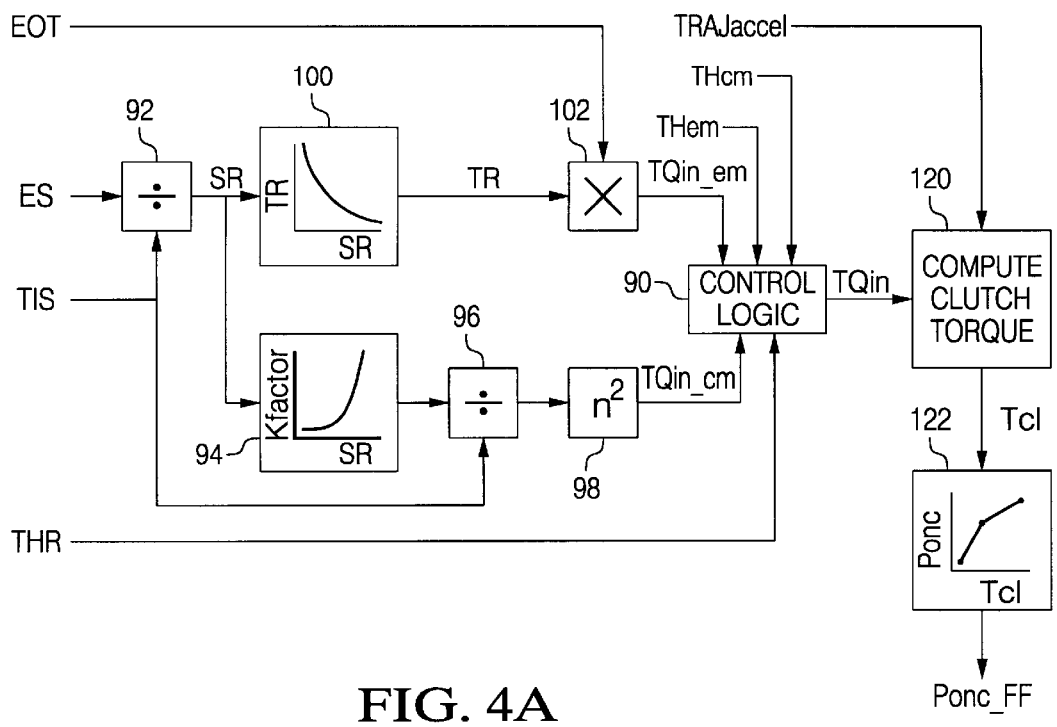
FIG. 4A is a block diagram illustrating the development of an input torque estimate and a feed-forward clutch pressure command according to this invention.
Figure 4B:
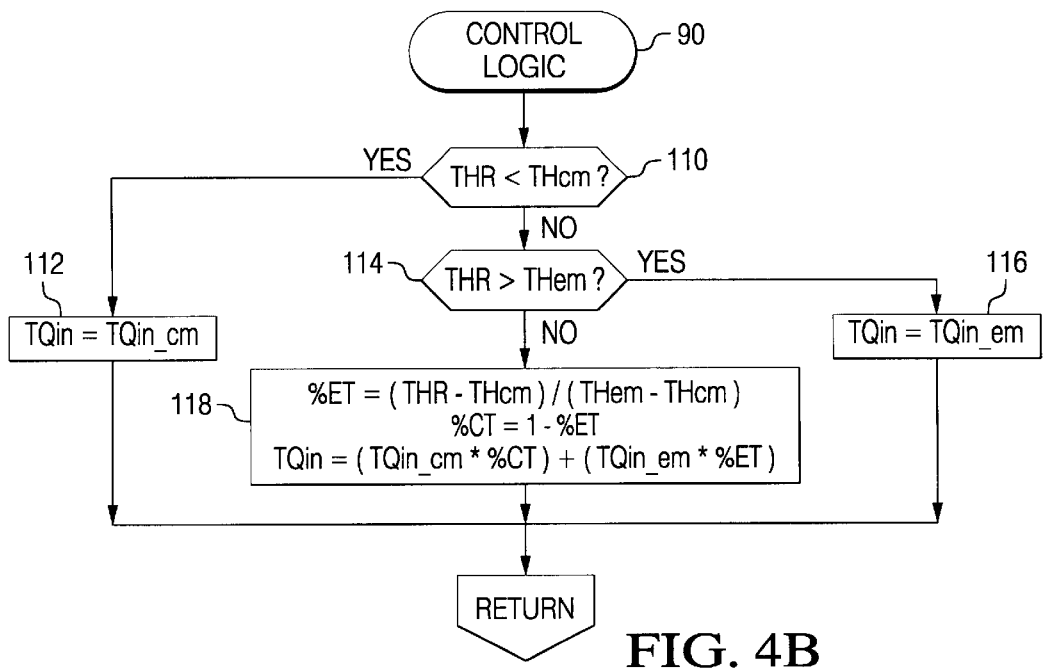
FIG. 4B is a flow diagram illustrating the functionality of a control logic block of FIG. 4A.

FIG. 4A is an overall block diagram of the input torque estimation and feed-forward pressure computation, including a Control Logic block 90, the functionality of block 90 being illustrated by the flow diagram of FIG. 4B. The inputs to block 90 include the engine throttle setting THR, a first input torque estimate TQin_cm based on a model of the torque converter 16, a second input torque estimate TQin_em based on a net engine torque model, an engine model throttle threshold THem, and a converter model throttle threshold THcm. The first torque estimate TQin_cm is based on a steady state model of torque converter 16, and is most accurate during engine idle conditions. The steady state torque converter model defines the input torque estimate TQin_cm as a function of TIS and the torque converter torque conversion factor (Kfactor) as follows:

$$TQin\_cm = (TIS/Kfactor)^2 \qquad (1)$$

where Kfactor is determined as a function of the torque converter speed ratio SR (defined as TIS/ES) based on empirically determined data for a given torque converter design and size. This relationship is represented in FIG. 4A by the blocks 92–96, where block 92 forms the speed ratio SR, block 94 represents a look-up table of Kfactor as a function of SR, block 96 forms the ratio TIS/Kfactor, and block 98 is a square function. The second torque estimate TQin_em is based on the net engine output torque (that is, the produced torque less the torque required to overcome engine friction) EOT reported by engine control unit 66, and is most accurate under off-idle conditions. The engine model defines the input torque estimate TQin_em as a function of EOT and the torque ratio TR of torque converter 16 as follows:

$$TQin\_em = EOT * TR \qquad (2)$$

where torque ratio TR is determined as a function of the torque converter speed ratio SR based on empirically determined data for a given torque converter design and size. This relationship is represented in FIG. 4A by the blocks 92 and 100–102, where block 92 forms the speed ratio SR, block 100 represents a look-up table of TR as a function of SR, and block 102 forms the product (EOT*TR).

Referring to FIG. 4B, if THR is less than the converter model threshold THcm, the Control Logic 90 sets the input torque estimate TQin equal to the first estimate TQcm; see blocks 110, 112. If THR is greater than the engine model threshold THem, the Control Logic 90 sets TQin equal to the second estimate TQin_em; see blocks 114, 116. If neither blocks 110 and 114 are satisfied, the block 118 ratiometrically determines the value of TQin by weighting the relative contributions of TQin_em and TQin_cm based on the deviation of THR from one of the thresholds THem, THcm. In the illustrated embodiment, the ratio (THR−THcm)/(THem−THcm) forms the weight factor %ET for the engine model, the weight factor %CT for the converter model is determined by the difference (1−%ET), and the input torque TQin is computed as follows:

$$TQin = (TQin\_cm * \%CT) + (TQin\_em * \%ET) \qquad (3)$$

The estimated input torque TQin and the input acceleration trajectory TRAJaccel are applied as inputs to block 120, which computes a model-based on-coming clutch torque TQc1 that will satisfy TRAJaccel, given TQin. The trajectory TRAJaccel may be a single value, or alternatively, may be dynamically determined based on variations in engine output torque EOT as set forth in the aforementioned co-pending U.S. patent application Ser. No. 09/528,609. In any event, the clutch torque Tc1 is computed as follows:

$$TQc1 = (K1 * TRAJaccel) + (K2 * TQin) \qquad (4)$$

where K1 and K2 are constants. The required torque Tc1, in turn, is applied to block 122, which outputs the feed-forward pressure Ponc_FF. In the illustrated embodiment, the block 122 represents a look-up table of clutch pressure vs. clutch torque for the particular on-coming clutch, and comprises a discrete number of data points forming a piece-wise linear approximation of the pressure vs. torque relationship. As indicated above, the data points may be adaptively adjusted based on the inertia phase closed-loop speed error, as a means of compensating for any modeling errors of block 120.

Referring again to FIG. 3, Ponc is reduced to a hold value Phold at the conclusion of the fill period at time t1, with Phold being computed as:

$$Phold = Ponc\_FF(t1) - \Delta Pcomp \qquad (5)$$

where Ponc_FF(t1) is the value of Ponc_FF at time t1, and ΔPcomp is a calibrated pressure that imparts a uniform perceived compliance to the control system. After a calibrated hold period Thold at time t2, Ponc is ramped upward toward the feed-forward pressure Ponc_FF at a defined ramp rate RR. When Ponc reaches Ponc_FF at time t3, Ponc is set equal to Ponc_FF until a pull-down of the input speed TIS is detected at time t4. The input speed pull-down condition may be detected, for example, by monitoring the input speed TIS for deceleration in excess of a threshold value. After input speed pull-down is detected, Ponc is determined according to the sum of Ponc_FF and a feedback pressure component Ponc_FB based on a comparison of the expected input shaft speed (from the trajectory TRAJaccel) with the measured speed TIS so as to correct for modeling errors in the feed-forward control. Finally, when the input speed TIS reaches the synchronous speed of the target gear (that is, TOS*SRtarget, where SRtarget is the speed ratio of the target gear), Ponc is set to a full pressure Pfull, completing the garage shift.

Figure 5:
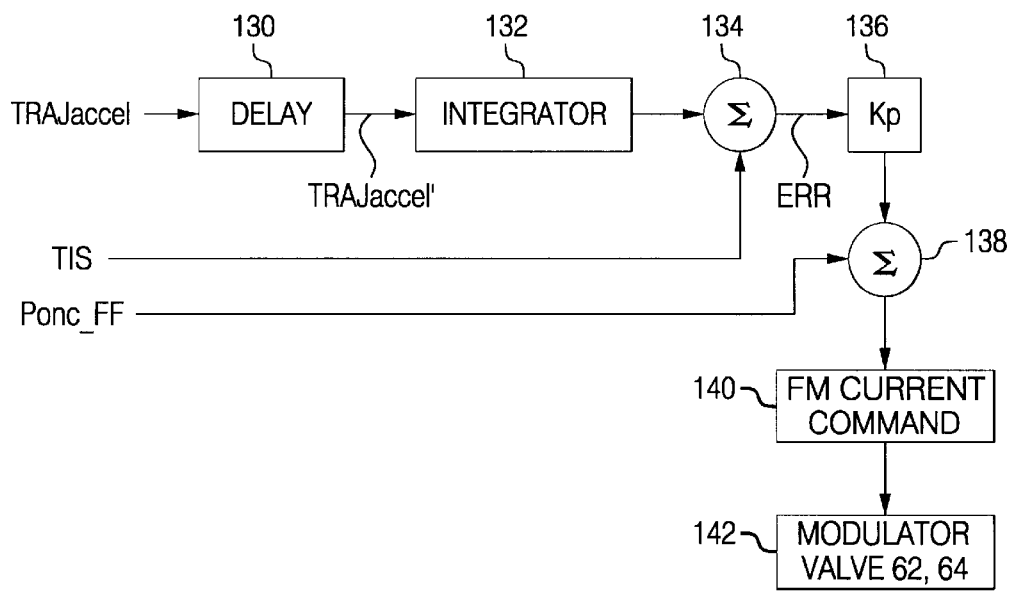
FIG. 5 is a block diagram illustrating the development of an inertia phase on-coming clutch pressure command according to this invention.

FIG. 5 is a block diagram of the development of Ponc during the inertia phase of the shift—that is, the interval beginning at input speed pull-down and ending at shift completion. The input acceleration trajectory TRAJaccel is applied as an input to block 130, which develops a delayed version (TRAJaccel') of the trajectory TRAJaccel, and block 132 then integrates TRAJaccel' to form an expected input speed (TISexp), given the combined electrical and hydraulic delays in producing the commanded on-coming pressure Ponc. The delay period may be determined by calibration, and the acceleration trajectory TRAJaccel may be integrated using a conventional discrete trapezoidal integration technique, as represented by the equation:

$$TISexp(current) = TISexp(last) + \Delta T/2[TRAJ(current)' + TRAJ(last)'] \quad (6)$$

where TISexp(current) and TISexp(last) are the current and last values of the expected input speed, $\Delta T$ is the update rate, and TRAJ(current)' and TRAJ(last)' are the current and last values of the input acceleration trajectory TRAJaccel (assuming a dynamically updated trajectory TRAJaccel). The expected input speed so developed is then applied along with the measured input speed TIS to summer 134, forming an input speed error ERR. The block 136 applies a proportional gain term Kp to ERR to form the feed-back pressure component Ponc_FB, which is combined with Ponc_FF in summer 138. The pressure command Ponc, in turn, is applied as an input to the block 140, which develops a current command for the respective modulated valve 62, 64, represented by the block 142.

Figure 6:
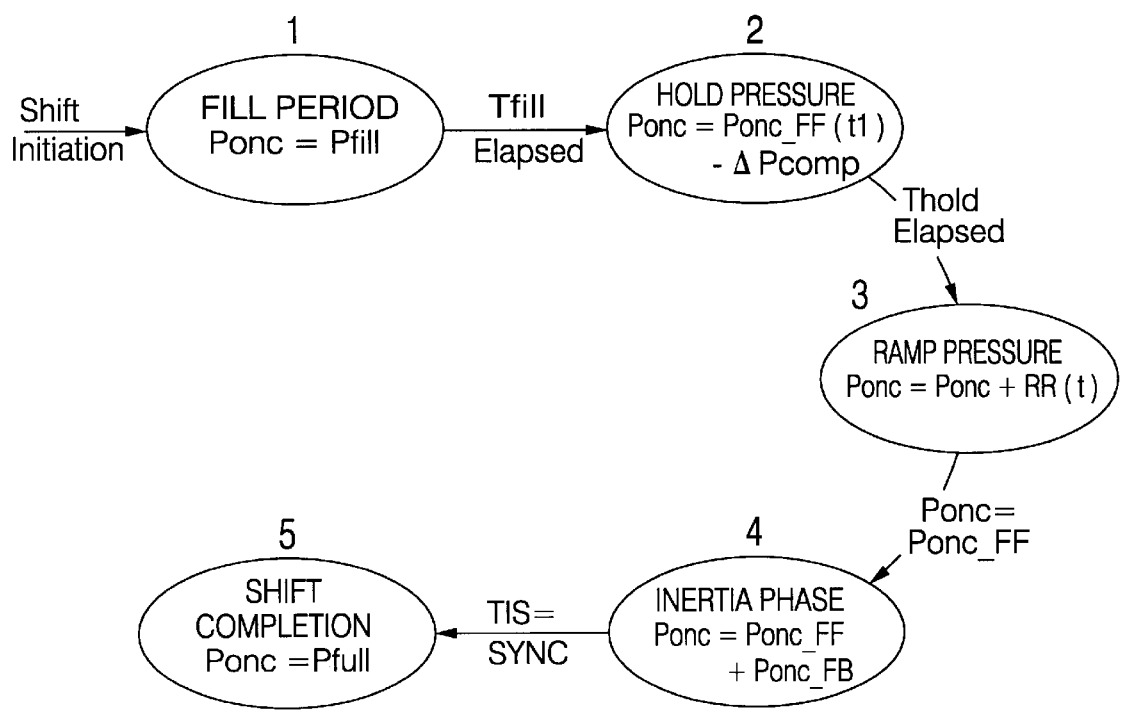
FIG. 6 is a state diagram illustrating a garage shift according to this invention.

FIG. 6 is a state diagram summarizing the above-described on-coming clutch control. Five successively executed states are represented: FILL, HOLD, RAMP, INERTIA PHASE, and COMPLETION. In the FILL state, the pressure command Ponc is set equal to the fill pressure Pfill, and the control transitions to the HOLD state when the fill period Tfill has elapsed. In the HOLD state, Ponc is determined in accordance with equation (5), and the control transitions to the RAMP state when the hold interval Thold has elapsed. In the RAMP state, Ponc is increase from the hold value to the current feed-forward pressure value Ponc_FF at a ramp rate RR, and the control transitions to the INERTIA PHASE state when Ponc reaches Ponc_FF. In the inertia phase, Ponc is determined according to the sum of the feed-forward and feed-back pressure components Ponc_FF, Ponc_FB, and the control transitions to the COMPLETION state when the input speed TIS reaches the synchronization speed SYNC. The COMPLETION state simply involves setting Ponc to the full or main pressure value Pfull.

In summary, the control of this invention uses a dynamic model of the transmission to estimate the transmission input torque during the shift and to schedule the on-coming clutch pressure in accordance with the estimated input torque to achieve a desired input shaft trajectory. The transmission input torque is estimated based on two different models—a torque converter model that is best suited to steady-state engine idle conditions, and an engine model that is best suited to engine output torque transient conditions. A fuzzy summation of the input torques provided by the two methodologies is utilized in transitions between the two conditions. The hold period introduces a relatively uniform perceived compliance, minimizing shift quality variations due to transmission-to-transmission variations in mechanical and/or hydraulic stiffness. The resulting control provides consistent high quality garage shifting, with less intensive calibration effort and improved adaptability to different powertrain and vehicle-type configurations.

While described in reference to the illustrated embodiment, it will be understood that various modifications in addition to those mentioned above will occur to those skilled in the art. Thus, it will be understood that controls incorporating these and other modifications may fall within the scope of this invention, which is defined by the appended claims.

What is claimed is:

1. A method of controlling an on-coming clutch pressure during a garage shift of a motor vehicle automatic transmission to a target speed ratio, the transmission having an input shaft coupled to a vehicle engine through a fluidic torque converter, and the method comprising the steps of:

filling the on-coming clutch at a determined fill pressure for a determined fill period;

estimating an input torque applied to the transmission input shaft by the engine through the torque converter;

applying the estimated input torque and a desired trajectory of said input shaft to an inverse dynamic model of the transmission to obtain an estimate of an on-coming clutch torque capacity for achieving said desired trajectory, and developing a feed-forward clutch pressure command based on the estimated clutch torque;

developing on-coming clutch pressure in accordance with the feed-forward clutch pressure command;

measuring a speed of the input shaft, and when initial engagement of the on-coming clutch produces a pull-down of said measured speed, adjusting the on-coming clutch pressure in accordance with a feed-back adjustment based on a deviation of the measured speed from an expected speed of the input shaft to compensate for errors in said inverse dynamic model; and raising the on-coming clutch pressure to complete the shift when the measured speed reaches a synchronous speed of the target speed ratio.

2. The method of claim 1, including the step of:

maintaining the pressure of the on-coming clutch at a constant hold value for a predetermined hold interval beginning upon expiration of said fill interval, the hold value being determined in accordance with an initial value of said feed-forward clutch pressure command, less a predetermined pressure amount.

3. The method of claim 2, including the step of:

increasing the pressure of the on-coming clutch upon expiration of the hold interval at a determined ramp rate until the on-coming pressure reaches said feed-forward pressure command.

4. The method of claim 1, wherein the step of estimating an input torque applied to the transmission input shaft includes the steps of:

determining a first input torque value based on an engine model, using an engine output torque indication received from an engine control unit and a ratio of the measured input speed to an engine speed;

determining a second input torque value based on a torque converter model, using the measured input speed and the ratio of the measured input speed to the engine speed;

setting the input torque estimate equal to said second input torque value during an idle condition of said engine; and setting the input torque estimate equal to said first input torque value during an off-idle condition of said engine.

5. The control method of claim 4, wherein the engine includes a throttle, and the off-idle condition is defined by a throttle setting above a first reference setting, and the idle condition is defined by a throttle setting below a second reference setting which is lower than said first reference setting.

6. The control method of claim 4, including the step of:

setting the input torque estimate to a computed value intermediate said first and second input torque values during transitions between said idle and off-idle conditions.

7. The control method of claim 6, wherein the idle and off-idle conditions are defined by comparing a setting of an engine throttle with first and second reference settings, wherein the transitions between said idle and off-idle conditions occur when the throttle setting is between said first and second reference settings, and wherein said computed value is based on a deviation of said throttle setting from one of said first and second reference settings.

* * * * *